United States Patent [19]
Mashimo

[11] Patent Number: 5,359,589
[45] Date of Patent: Oct. 25, 1994

[54] OPTICAL INFORMATION RECORDING AND REPRODUCING APPARATUS HAVING FUNCTIONS FOR ADJUSTING INTENSITY OF LIGHT BEAM

[75] Inventor: Akira Mashimo, Tokorozawa, Japan

[73] Assignee: Teac Corporation, Japan

[21] Appl. No.: 535,893

[22] Filed: Jun. 11, 1990

[30] Foreign Application Priority Data

Jun. 13, 1989 [JP] Japan .................... 1-149790

[51] Int. Cl.$^5$ .................................. G11B 7/00
[52] U.S. Cl. ...................... 369/116; 369/48; 369/54; 369/44.32
[58] Field of Search ............ 369/116, 53, 54, 48, 369/58, 44.32, 44.33, 121, 111

[56] References Cited

U.S. PATENT DOCUMENTS

| | | | |
|---|---|---|---|
| 4,701,609 | 10/1987 | Koishi et al. | 369/116 |
| 4,788,674 | 11/1988 | Maeda et al. | 369/54 |
| 4,807,206 | 2/1989 | Moriya et al. | 369/44.25 |
| 4,821,125 | 4/1989 | Christensen et al. | 369/53 |
| 4,866,692 | 9/1989 | Saito et al. | 369/54 |
| 4,907,212 | 3/1990 | Pharris et al. | 369/53 |
| 4,935,915 | 6/1990 | Fujiwara et al. | 369/116 |
| 4,989,198 | 1/1991 | Kojima et al. | 369/116 |
| 5,027,339 | 6/1991 | Yoda et al. | 369/54 |
| 5,061,695 | 10/1991 | Tominaga | 369/44.35 |
| 5,070,495 | 12/1991 | Bletscher, Jr. et al. | 369/116 |

FOREIGN PATENT DOCUMENTS

58-143444  8/1983  Japan .................... 369/116

*Primary Examiner*—Tommy P. Chin
*Assistant Examiner*—Thai Tran
*Attorney, Agent, or Firm*—Andrus, Sceales, Starke & Sawall

[57] ABSTRACT

An apparatus for recording and reproducing information on and from a rotary information recording disc by using a light beam includes an intensity detector for detecting a recording light intensity which is the intensity of the light beam at the time of recording information on the basis of a reproduction signal obtained by projecting the light beam onto the rotary information recording disc at the time of reproducing information, a comparator for comparing the recording light intensity with a predetermined optimum value and giving a comparison result, and an adjuster for adjusting an intensity of the light beam at the time of recording information, so that the intensity of the light beam at the time of recording information becomes the optimum value.

6 Claims, 5 Drawing Sheets

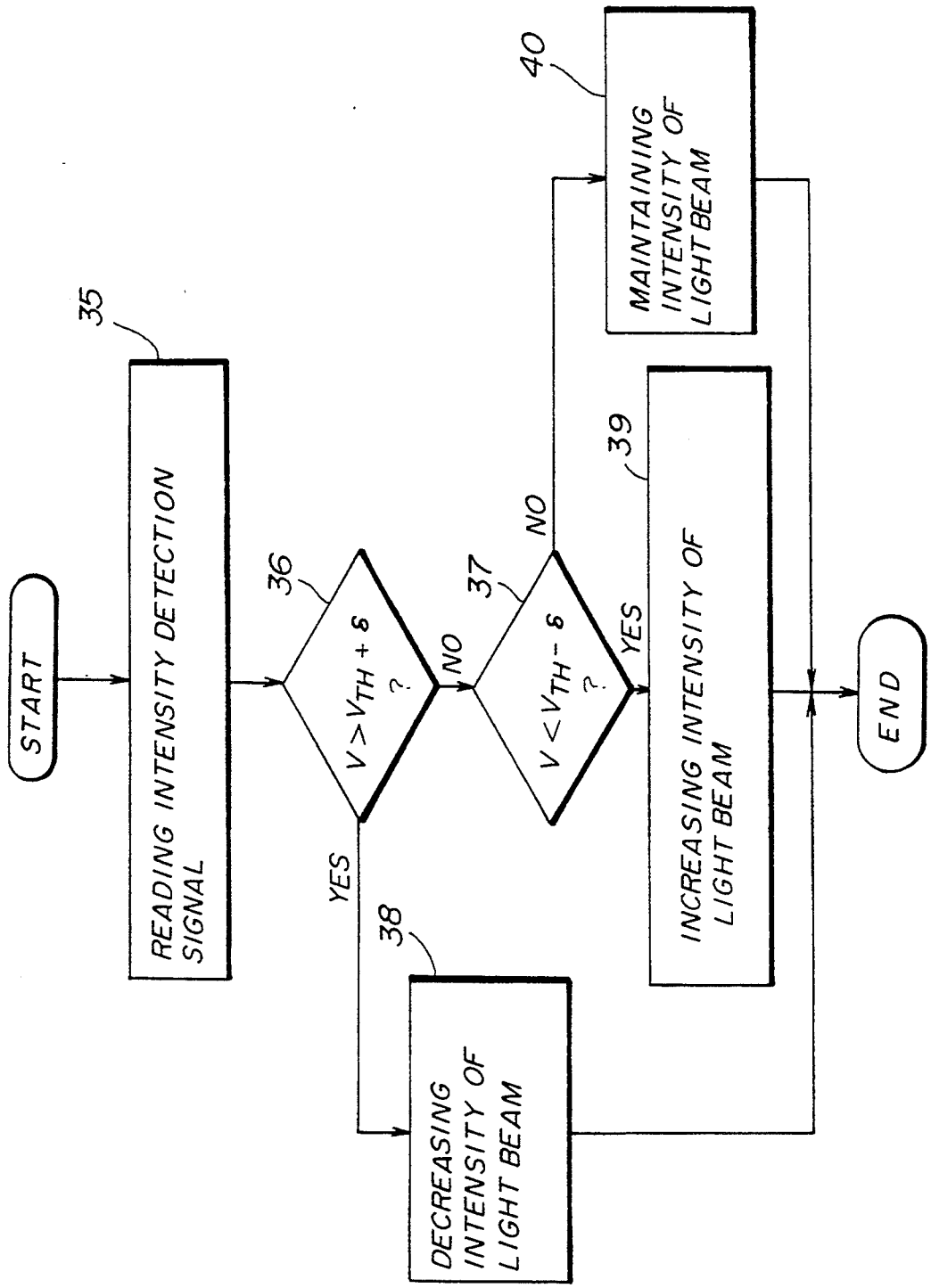

OPTICAL INFORMATION RECORDING AND REPRODUCING APPARATUS HAVING FUNCTIONS FOR ADJUSTING INTENSITY OF LIGHT BEAM

BACKGROUND OF THE INVENTION

The present invention generally relates to an information recording and reproducing apparatus, and more particularly to an apparatus for recording and reproducing information on and from a rotary recording medium such as an optical disc and an optical magnetic disc using a light beam emitted from a light source such as a laser diode.

In a conventional information recording and reproducing apparatus, the intensity of a laser beam is controlled so as to be fixed to a constant level. Then, information is recorded and reproduced on and from a disc such as an optical disc and an optical magnetic disc by using the laser beam.

There are delicate differences of recording sensitivity in every disc and differences of environment temperature in every recording time so that the conditions for recording information on the disc change for every disc and every recording time. Thus, it is difficult to always record information under the best conditions. As the result of this, there is a disadvantage in that there are cases where frequent errors occur at the time of reproducing information. There is also a disadvantage in that there is the possibility that the life of information recorded on the disc will become short. That is, the time during which information recorded on the disc is held on it will become short.

SUMMARY OF THE INVENTION

Accordingly, a general object of the present invention is to provide a novel and useful apparatus for recording and reproducing information on and from a rotary information recording disc by using a light beam, in which the disadvantages of the aforementioned prior art are eliminated.

A more specific object of the present invention is to provide an apparatus for recording and reproducing information on and from a rotary information recording disc capable of always recording information by using a light beam having an optimum intensity.

The above objects of the present invention can be achieved by an apparatus for recording and reproducing information on and from a rotary information recording disc by using a light beam comprising, intensity detection means for detecting a recording light intensity which is an intensity of the light beam at a time of recording information on the basis of a reproduction signal obtained by projecting the light beam onto the rotary information recording disc at a time of reproducing information, comparison means for comparing the level of the reproduction signal detected by the intensity detection means with an optimum value and giving a comparison result, adjusting means for adjusting an intensity of the light beam at a time of recording information, in accordance with the comparison result from the comparison means, so that the intensity of the light beam at the time of recording information becomes an optimum.

Other objects and further features of the present invention will become apparent from the following detailed description when read in conjunction with the accompanying drawings.

BRIEF DESCRIPTION OF THE DRAWINGS

FIG. 6 is a flow chart illustrating the flow of the process performed by the controller.

DESCRIPTION OF THE PREFERRED EMBODIMENTS

Figure 1:
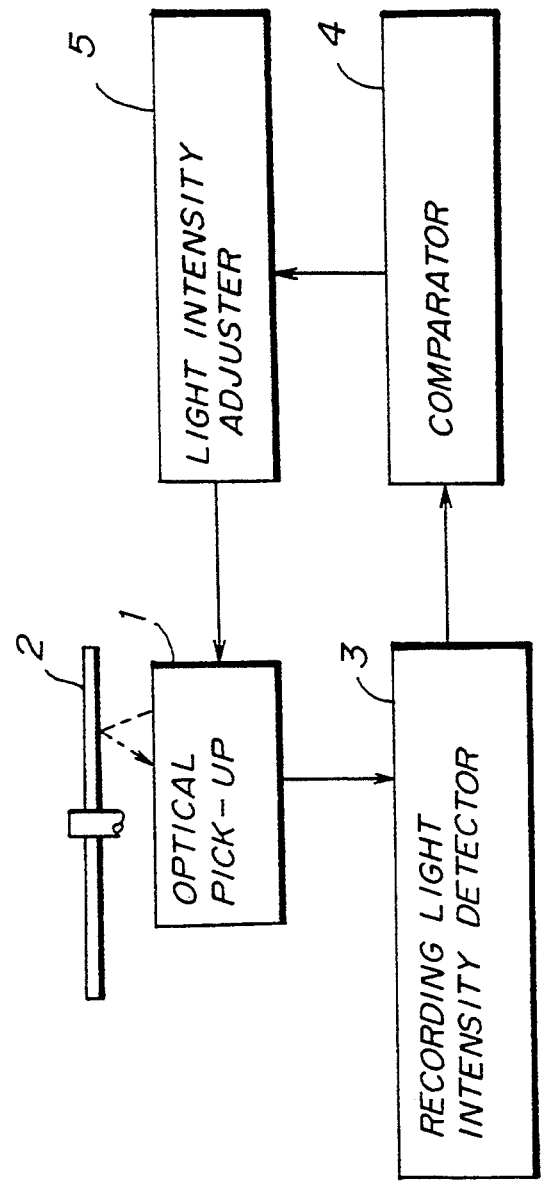
FIG. 1 is a block diagram illustrating the principle of the present invention.

A description will now be given of the principle of the present invention with reference to FIG. 1.

An optical pick-up 1 emits a light beam on a disc 2 (a rotary information recording disc) for recording information on the disc and for reproducing information from the disc 2. The optical pick-up detects a light beam reflected by the disc 2 and outputs a signal corresponding to the intensity of the light beam. A recording light intensity detector 3 detects the intensity of the light beam at the time of recording information on the basis of the signal output from the optical pick-up 1. A comparator 4 compares the intensity of the light beam detected by the recording light intensity detector 3 with an optimum value and outputs a comparison result signal. A light intensity adjuster 5 adjusts the intensity of the light beam output from the optical pick-up 1 at the time of recording information, in accordance with the comparison result signal output from the comparator 4, so that the intensity of the light beam output from the optical pick-up 1 at the time of recording information becomes the optimum value.

According to the recording and reproduction apparatus above mentioned, the intensity of the light beam output from the optical pick-up 1 at the time of recording information always becomes the optimum value.

A description will now be given of a preferred embodiment of the present invention with reference to FIG. 2 through FIG. 6.

Figure 2:
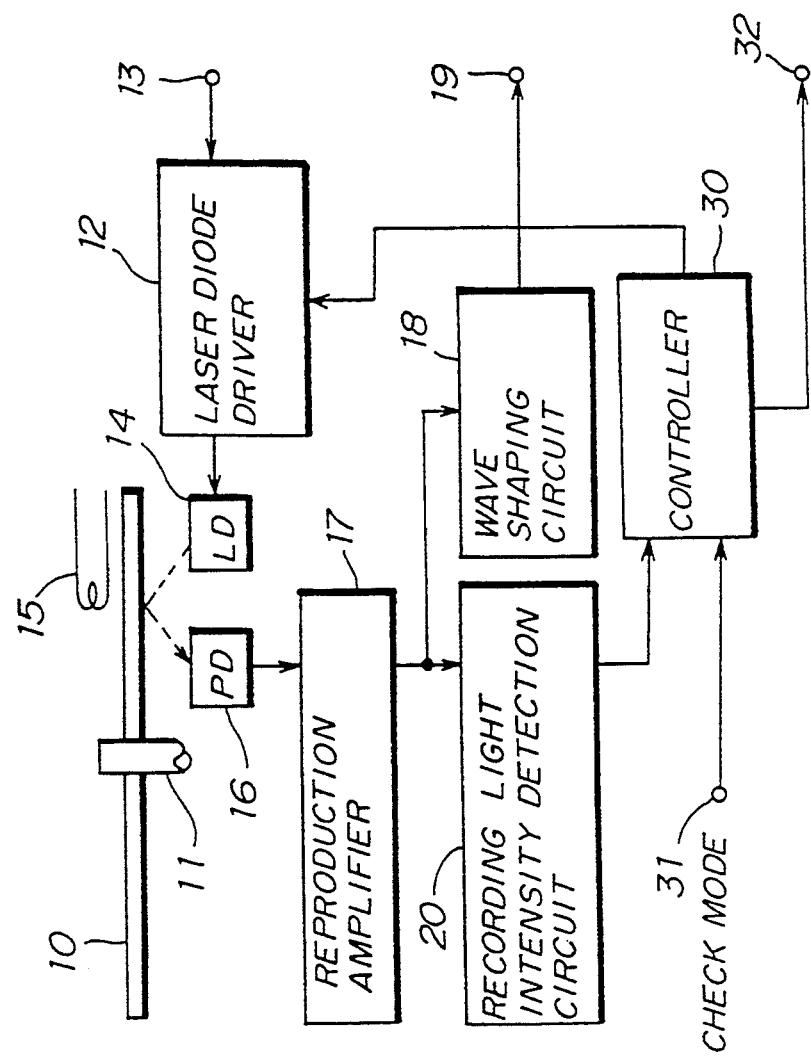
FIG. 2 is a block diagram of a preferred embodiment of the present invention.

FIG. 2 shows the construction of the recording and reproduction apparatus. This recording and reproduction apparatus is an optical magnetic disc apparatus.

At the time of recording, a recording signal which is modulated by using, for example, the four out of eleven modulation method (4/11 modulation) is applied through an input terminal 13 to a laser diode driver 12. In a signal modulated by using the four out of eleven modulation method (4/11 modulation), one information unit of the signal has eleven bits, and each of the eleven bits corresponds to a cycle of a predetermined clock pulse. Then, in one information unit of the modulated signal, each of arbitrary four bits out of the eleven bits has an active binary value (for example "1"), and each of the remaining bits has an inactive binary value (for example "0"). The laser diode driver 12 drives a laser diode 14(LD) so that it emits a light beam having an intensity based on the modulated recording signal. At the time of reproducing, the laser diode driver 12 drives the laser diode 14 so that is emits a light beam having a constant intensity. The light beam emitted from the laser diode 14 is projected onto a surface of an optical magnetic disc 10 which is rotated by a driving shaft 11.

At the time of recording, a coercive force decreases at a portion of the optical magnetic disc 10 onto which the light beam having an intensity corresponding to recording data "1" is projected. Then, the direction of magnetization at the portion is inverted by a recording magnetic coil 15 so that information expressing "1" is recorded on the portion of the optical magnetic disc 10. At the time of reproduction, a plane of the polarization of a light beam reflected by the optical magnetic disc 10 rotates according to the direction of magnetization so that the intensity of the reflected beam changes. A photo diode 16(PD) detects the reflected beam. The photo diode 16 outputs a detection signal having a level corresponding to the intensity of the reflected beam input to it. A reproduction amplifier 17 amplifies the detection signal output from the photo diode 16. An output signal from the reproduction amplifier 17 is supplied to a wave shaping circuit 18 and a recording light intensity detection circuit 20. The wave shaping circuit 18 shapes the output signal from the reproduction amplifier 17 and outputs a rectangular pulse signal. Then, the rectangular pulse signal output from the wave shaping circuit 18 is supplied through a terminal 19 to a demodulator (which is not shown in FIG. 2) as a reproduction signal. The recording light intensity detection circuit 20 detects, on the basis of the output signal which is output from the reproduction amplifier 17 at the time of reproducing, the intensity of the light beam output from the laser diode 14 at the time of recording.

Figure 3:
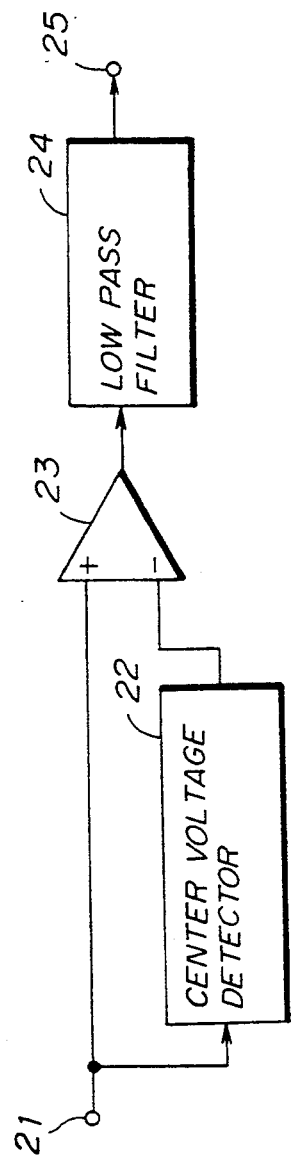
FIG. 3 is a block diagram illustrating the construction of the recording light intensity detection circuit shown in FIG. 2.

The recording light intensity detection circuit 20 has a center voltage detector 22, a comparator 23 and low pass filter 24, as shown in FIG. 3. Since the output signal from the reproduction amplifier 17 corresponds to the detection signal output from the photo diode 16, the output signal from the amplifier 17 is termed the detection signal. The detection signal is input to a terminal 21. The detection signal is supplied from the terminal 21 to the center voltage detector 22 and a non-inverting input terminal of the comparator 23. The center voltage detector 22 detects a center voltage between the maximum voltage of the detection signal and the minimum voltage of the detection signal. The center voltage output from the center voltage detector 22 is applied to an inverting terminal of the comparator 23. The comparator 23 compares the detection signal with the center voltage of the detection signal, shapes the detection signal and outputs a rectangular pulse signal. The rectangular pulse signal is input to the low pass filter 24. The low pass filter 24 integrates the rectangular pulse output from the comparator 23 and outputs an average voltage of the rectangular pulse. The average voltage output from the low pass filter 24 corresponds to the intensity of the light beam emitted from the laser diode 14 at the time of recording. Then, the average voltage is supplied through a terminal 25 to a controller 30 (refer to FIG. 2) as an intensity detection signal.

Figure 4:
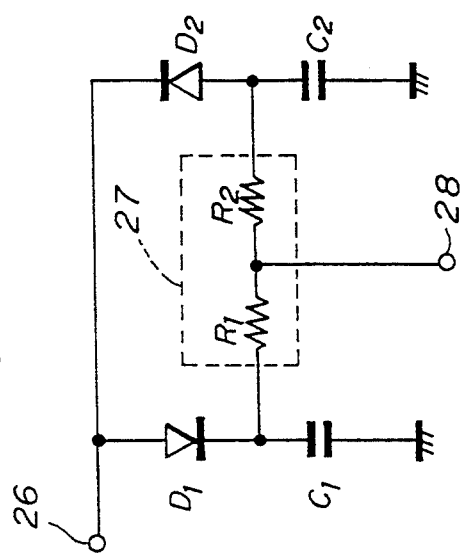
FIG. 4 is a circuit diagram showing the construction of the center voltage detector shown in FIG. 3.

The center voltage detector 22 has, for example, a structure as shown in FIG. 4.

Referring to FIG. 4, the detection signal is input to a terminal 26. The terminal 26 is connected to an anode of a diode D1. A condenser C1 is connected between a cathode of the diode D1 and the ground. The terminal 26 is also connected to a cathode of a diode D2. A condenser C2 is connected between an anode of the diode D2 and the ground. A potential divider 27 is provided between the cathode of the diode D1 and the anode of the diode D2. The potential divider 27 has resistors R1 and R2. The resistors R1 and R2 are connected to each other. The resistor R1 is also connected to the cathode of the diode D1, and the resistor R2 is also connected to the anode of the diode D2. The point where the resistors R1 and R2 are connected to each other is connected to a terminal 28. The resistors R1 and R2 have the same resistance. The positive peak voltage (maximum voltage) of the detection signal is charged through the diode D1 in the condenser C1 The negative peak voltage (minimum voltage) of the detection signal is charged through the diode D2 in the condenser C2. Then, a difference between the voltage charged in the condenser C1 and the voltage charged in the condenser C2 is divided into halves by the potential divider 27. Thus, the center voltage between the maximum voltage of the detection signal and the minimum voltage of the detection signal occurs at the terminal 28.

In the recording light intensity detection circuit 20 as shown in FIG. 3, when the intensity of the light beam emitted from the laser diode 14 at the time of recording is optimum, the comparator 23 outputs a rectangular pulse signal, such as that shown in FIG. 4(A). That is, since the recording signal is modulated by using the four out of eleven modulation method (4/11 modulation), the rectangular pulse signal output from the comparator 23 has a high level(active) during four clocks of the eleven clocks in one information unit, as shown in FIG. 4 (A). Thus, the intensity detection signal output through the terminal 25 has a level of ($V_{pp}$·4/11), where $V_{pp}$ is a peak-to-peak voltage of the rectangular pulse signal. On the other hand, when the intensity of the light beam emitted from the laser diode 14 at the time of recording is greater than the optimum value, the comparator 23 outputs a rectangular pulse signal such as that shown in FIG. 4(B). That is, the amplitude of the detection signal input to the terminal 21 is greater than that in the optimum case, and the rectangular pulse signal has a high level during a time of more than four clocks in one information unit, as shown in FIG. 4(B). Thus, the intensity detection signal has a level greater than the level of ($V_{pp}$·4/11) in the optimum case. In addition, when the intensity of the light beam emitted from the laser diode 14 at the time of recording is less than the optimum value, the comparator 23 outputs a rectangular pulse signal such as that shown in FIG. 4(C). That is, the amplitude of the detection signal is less than that in the optimum case, and the rectangular pulse signal has a high level during a time of less than four clocks in one information unit, as shown in FIG. 4(C). Thus, the intensity detection signal has a level less than the level of ($V_{pp}$·4/11) in the optimum case.

In FIG. 2, when a check mode signal output from a general controller (which is shown in FIG. 2) becomes active and is input through a terminal 31 to the controller 30, the controller 30 outputs a control signal for a test recording mode through a terminal 32. The control signal for the test recording mode is supplied to a recording system. The controller 30 supplies a intensity control signal which expresses a predetermined intensity of the light beam to the laser diode driver 12. Then, a test signal is supplied to the laser diode driver 12, the test signal is recorded by a light beam having the predetermined intensity on the optical magnetic disc 10. After that, the test mode is changed to a reproduction mode, and the test signal recorded on the optical magnetic disc 10 is reproduced. That is, the intensity detection signal corresponding to the test signal is output from the recording light detection circuit 20 and is supplied to the controller 30. Then, the controller 30 converts the intensity detection signal to a digital signal and performs the processes shown in FIG. 6.

Figure 5:
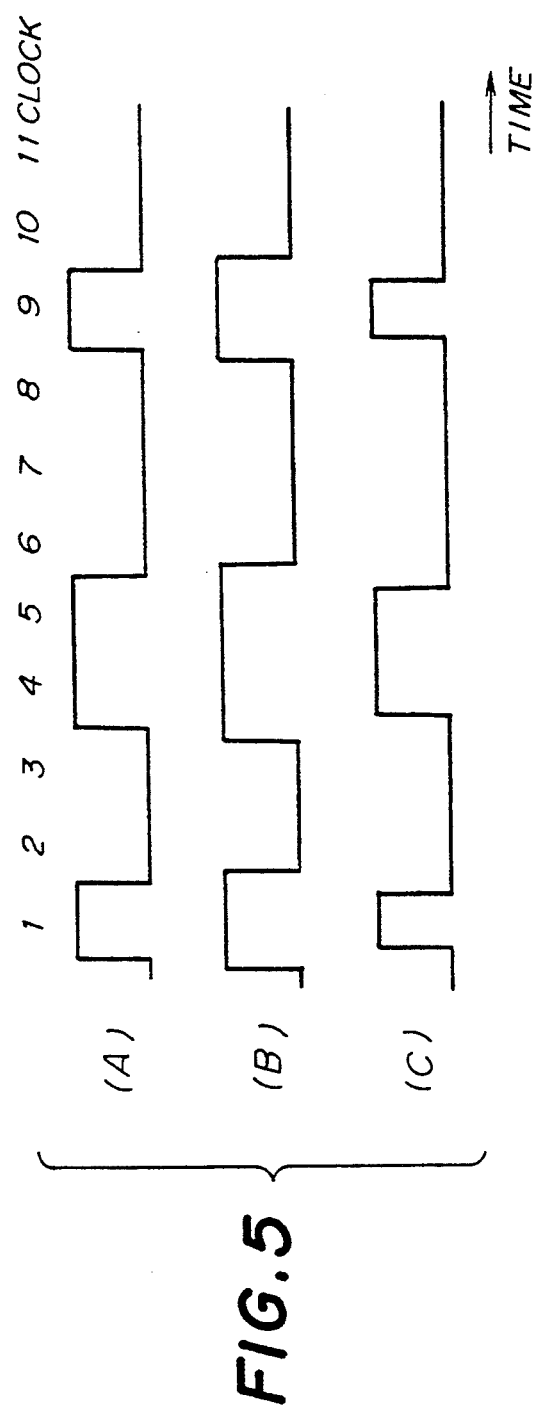
FIG. 5 is a wave form chart illustrating the wave forms of the reproduction signals.

A step 35 reads the level(V) of the digitalized intensity detection signal. A step 36 determines whether or not the level(V) of the intensity detection signal greater than a level of $(V_{TH}+\delta)$. $V_{TH}$ is a reference level and has a value corresponding to $(V_{pp} \cdot 4/11)$. $\delta$ is an allowance value, and for example, corresponds to $(V_{pp} \cdot 0.5/11)$. If the level(V) of the intensity detection signal is greater than the level of $(V_{TH}+\delta)$, a step 38 gives an instruction to decrease the intensity of the light beam output from the laser diode 14 to the laser diode driver 12. This case is shown in FIG. 5 (B). In this case, the intensity of the light beam is controlled according to the difference between the level(V) and $(V_{TH}+\delta)$ so that the level(V) of the intensity detection signal becomes a value between $V_{TH}$ and $(V_{TH}+\delta)$. If the level(V) of the intensity detection signal is less than or equal to $(V_{TH}+\delta)$, a step 37 determines whether or not the level(V) of the intensity detection signal is less than the level of $(V_{TH}-\delta)$. If the level(V) of the intensity detection signal is less than the level of $(V_{TH}-\delta)$, a step 39 gives an instruction to increase the intensity of the light beam output from the laser diode 14 to the laser diode driver 12. This case is shown in FIG. 5(C). In this case, the intensity of the light beam is controlled according to the difference between the level(V) and $(V_{TH}-\delta)$ so that the level(V) of the intensity detection signal becomes a value between $(V_{TH}-\delta)$ and $V_{TH}$. If the step 37 determines that the level(V) of the intensity detection signal is greater than or equal to $(V_{TH}-\delta)$, a step 40 gives an instruction to maintain the intensity of the light beam output from the laser diode 14 to the laser diode driver 12. This case is shown in FIG. 5 (A). In this case, the intensity of the light beam is optimum so that this condition of the light beam is maintained.

When information is actually recorded on the optical magnetic disc 10 after the process for the check mode above mentioned, the intensity of the light beam emitted from the laser diode 14 is controlled to the value determined in accordance with the instruction given at one of the above steps 38, 39 and 40. Thus, at the time of recording information, the intensity of the light beam emitted from the laser diode 14 is always controlled so as to be within a range of $(V_{TH} \pm \delta)$. That is, the intensity of the light beam at the time of recording is always maintained in the optimum value. Thus, it is possible to prevent an increase in the frequency of errors during the time of recording, and there is no possibility that the life of information recorded on the disc will become short.

The present invention is not limited to an optical magnetic disc apparatus, and for example, can be applied to an optical disc apparatus.

In addition, an ordinary information signal for the sake of recording can be used instead of a test signal.

As has been described above, according to the present invention, it is possible for the intensity of the light beam at the time of recording to always become the optimum value without reference to the characteristics of the disc and changes in environment temperature. Thus, it is possible to decrease the frequency of errors at the time of recording, and to lengthen the life of the recording information in the disc.

The present invention is not limited to the aforementioned embodiments, and variations and modifications may be made without departing from the scope of the claimed invention.

What is claimed is:

1. An apparatus for recording and reproducing information on and from a rotary information recording disc by using a light beam comprising:

intensity detection means for detecting a recording light intensity based on a reproduction signal obtained by projecting said light beam onto said rotary information recording disc at a time information is reproduced, said recording light intensity being an intensity of said light beam at a time information is recorded, said intensity detection means including a wave shaping means having center voltage detection means for detecting a center voltage which has a level positioned at a center of a range between a maximum voltage of said reproduction signal and a minimum voltage of said reproduction signal and comparator means for comparing said reproduction signal with said center voltage detected by said center voltage detection means and for outputting a rectangular pulse signal, the level of which varies in accordance with the comparison result of said comparator means, said intensity detection means further including means for integrating said rectangular pulse signal output from said wave shaping means and outputting an average voltage of said rectangular pulse signal as an indication of recording light intensity;

determination means for determining whether or not said recording light intensity detected by said intensity detection means is within a permissible range and for outputting a determination result, said permissible range having an optimum value contained therein; and adjusting means for adjusting the intensity of said light beam at the time information is recorded on said disk in accordance with said determination result from said determination means, so that the intensity of said light beam at the time information is recorded is adjusted within the permissible range.

2. An apparatus as claimed in claim 1, wherein said center voltage detection means has first holding means for holding said maximum voltage of said reproduction signal, second holding means for holding said minimum voltage of said reproduction signal, and potential dividing means for dividing a difference between said maximum voltage held by said first holding means and said minimum voltage held by said second holding means by two and outputting said center voltage so obtained.

3. An apparatus as claimed in claim 1, wherein said determination means has first level comparison means for comparing said average level of said reproduction signal detected by said level detection means with a first voltage level $(V_{TH}+\delta)$, and second level comparison means for comparing said average level of said reproduction signal detected by said level detection means with a second voltage level $(V_{TH}-\delta)$, wherein $V_{TH}$ is a predetermined reference level and is a predetermined allowance value, whereby said determination means determines whether or not said average level of said reproduction signal is within a permissible range between the first and second voltage levels based on comparison results obtained by said first and second level comparison means.

4. An apparatus as claimed in claim 3, wherein said adjusting means has first controlling means for controlling the intensity of said light beam when said average level of said reproduction signal is greater than said first voltage level ($V_{TH}+\delta$) according to a difference between said average level of said reproduction signal and said first voltage level ($V_{TH}+\delta$), so that said average level of said reproduction signal assumes a value within a range between said predetermined reference level $V_{TH}$ and said first voltage level ($V_{TH}+\delta$).

5. An apparatus as claimed in claim 3, wherein said adjusting means has second controlling means for controlling the intensity of said light beam when said average level of said reproduction signal is less than said second voltage level ($V_{TH}-\delta$) according to a difference between said second voltage level of ($V_{TH}-\delta$) and said average level of said reproduction signal, so that said average level of said reproduction signal assumes a value within a range between said second voltage level ($V_{TH}-\delta$) and said predetermined reference level $V_{TH}$.

6. An apparatus as claimed in claim 3, wherein said adjusting means has third controlling means for controlling the intensity of said light beam when said average level of said reproduction signal is less than or equal to said first voltage level ($V_{TH}+\delta$) and said average level of said reproduction signal is greater than or equal to said second voltage level ($V_{TH}-\delta$), so that said average level of said reproduction signal is maintained.

* * * * *